United States Patent [19]
Wilwerding

[11] 3,863,128
[45] Jan. 28, 1975

[54] VOLTAGE MONITORING CONTROLLING AND PROTECTING APPARATUS EMPLOYING PROGRAMMABLE UNIJUNCTION TRANSISTOR

[75] Inventor: Dennis J. Wilwerding, Littleton, Colo.

[73] Assignee: Honeywell Inc., Minneapolis, Minn.

[22] Filed: July 30, 1973

[21] Appl. No.: 384,066

[52] U.S. Cl. ............ 320/21, 307/252 F, 315/241 P, 321/14, 323/20
[51] Int. Cl. .......................................... H05b 41/16
[58] Field of Search ...... 307/252 F, 301; 315/241 P; 320/21; 321/2, 14; 323/20, 22 T, 22 SC

[56] References Cited
UNITED STATES PATENTS

| | | | |
|---|---|---|---|
| 3,229,158 | 1/1966 | Jensen | 315/241 P |
| 3,588,675 | 6/1971 | Suzuki | 323/22 T |
| 3,644,818 | 2/1972 | Paget | 315/241 P |
| 3,684,919 | 8/1972 | Cramer | 307/252 F |
| 3,754,182 | 8/1973 | Morris et al | 323/22 T |
| 3,767,940 | 10/1973 | Herzog et al | 307/252 F |

*Primary Examiner*—A. D. Pellinen
*Attorney, Agent, or Firm*—Arthur H. Swanson; Lockwood D. Burton; George E. Bodenstein

[57] ABSTRACT

A PUT circuit compares a zener reference voltage with the voltage of an electronic flash storage capacitor, and starts and stops a battery powered d.c. to d.c. converter oscillator, which charges the capacitor, as necessary to maintain the capacitor voltage within desired limits. A zener diode in the PUT cathode circuit provides the desired hysteresis. A second PUT circuit compares a second zener reference voltage with the battery voltage, and stops the oscillator when the battery voltage drops to a predetermined minimum value.

11 Claims, 1 Drawing Figure

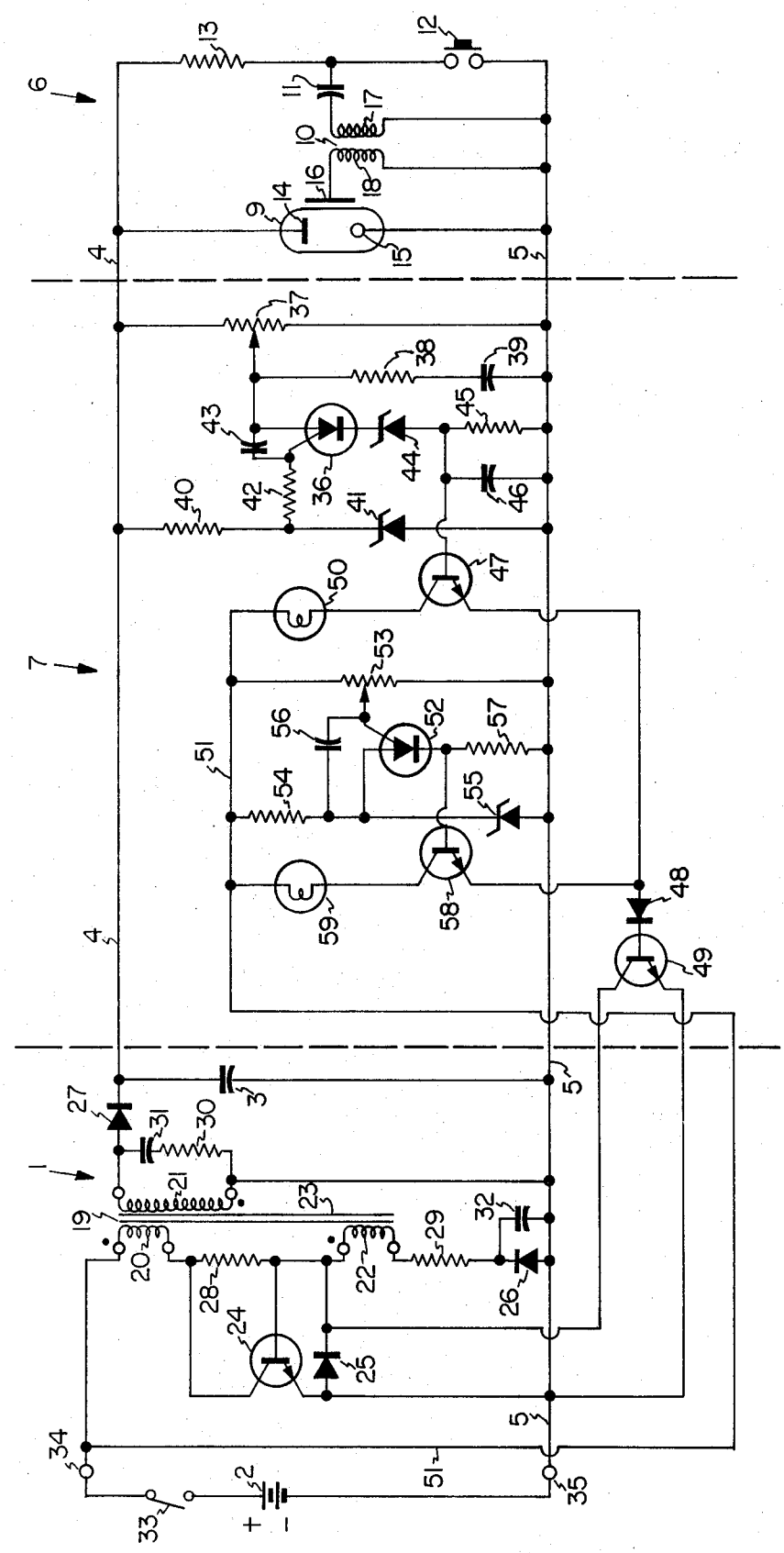

VOLTAGE MONITORING CONTROLLING AND PROTECTING APPARATUS EMPLOYING PROGRAMMABLE UNIJUNCTION TRANSISTOR

CROSS-REFERENCE TO RELATED APPLICATION

Subject matter which is disclosed but not claimed herein is disclosed and claimed in the copending application of F. T. Ogawa and D. J. Wilwerding, Ser. No. 374,548, filed June 28, 1973.

BACKGROUND OF THE INVENTION

FIELD OF THE INVENTION

The present invention relates generally to electronic controlling or protecting apparatus of the voltage monitoring type, and relates specifically to such apparatus for terminating or limiting the operation of a power supply means, supplying power to a load, when a voltage associated with the power supply means moves out of a desired voltage range. In its more specific aspects, the invention relates to apparatus of the type just described which effectively starts and stops a power supply, such as a battery powered d-c to d-c converter which charges a capacitor, as necessary to maintain the power supply output and capacitor voltage within a desired range, to protect the capacitor from being excessively charged and from unduly high voltages, and to prevent the unwanted withdrawal of energy from the battery.

DESCRIPTION OF THE PRIOR ART

Monitoring, controlling, or protecting apparatus or arrangements of the type just described have been known and employed extensively in the past in various forms. A particularly representative and widely used one of these forms is that wherein the known arrangement controls the battery powered d-c to d-c converter oscillator which charges the flash storage capacitor of a photographic electronic flash device. Typical examples of this form of the known arrangements are those which are disclosed in the following items:

Japanese Pat. Publication No. 2086/63.
U.S. Schmidt et al. Pat. No. 3,310,723
U.S. Wilwerding Pat. No. 3,679,991.

Because of the representative nature of this form of the known arrangements, it is this form of arrangement which has been used as the basis for the following discussion of the prior art.

The known arrangements, such as those disclosed in the items listed above, are intended to stop or at least curtail the operation of the associated oscillator when the oscillator output and capacitor voltage, and the capacitor charge, have been raised by the oscillator to desired maximum values. Said arrangements are further intended to restart or intensify the operation of the oscillator when the capacitor voltage and charge drop below desired minimum values. This latter condition occurs as a result of the firing of the associated flash tube, capacitor leakage, and/or the consumption of the capacitor energy by other components of the apparatus.

Accordingly, the control of the oscillators by the known arrangements as just described has been provided in an attempt to maintain the oscillator output and capacitor voltage within a desired working range, i.e., between desired maximum and minimum limits or values. It should be understood in this connection that each reference which is made herein to the maintenance of said voltage within a desired working range or between desired values takes into account and recognizes the known fact, without so stating, that said voltage will unavoidably and necessarily go or be below this range for a time following each firing of the associated flash tube or each extended period of apparatus idleness or nonuse. Thus, each such reference refers only to the operation which takes place after the oscillator has brought said voltage up into the working range following each time that said voltage is necessarily below this range for either of the two reasons noted above. This applies not only to the known arrangements, but also to the novel apparatus provided in accordance with the present invention.

The above described oscillator control effected by the known arrangements has also been provided in an attempt to protect the capacitor and the associated components by preventing the oscillator output and capacitor voltage from rising to an unduly high or unsafe value. Such protection is particularly important in the noted photographic electronic flash field or application because of the widespread use in photographic flash devices of the flyback type of oscillator, and because such an oscillator inherently tries to increase the capacitor voltage indefinitely while the oscillator is operating.

Another important purpose which the known arrangements have been intended to serve is the prevention of the unnecessary withdrawal of energy from the battery which powers the oscillator. This prevention of the unnecessary expenditure of the battery energy is particularly important in the photographic electronic flash field. This is so because it is highly desirable in a photographic flash device to obtain as many capacitor chargings, and hence as many flashes, as possible from a battery of given size, or from each charging of a given size rechargeable battery. It has been intended that such "battery saving" be effected by the noted action in the known arrangements of preventing the further charging of the capacitor once the voltage of the oscillator output and the capacitor has risen to a desired value.

Although the known arrangements referred to above have, broadly speaking, provided generally satisfactory performance, they have exhibited certain specific, practically serious shortcomings. For example, the known arrangements have employed either a neon lamp or a diode to sense the oscillator output and capacitor voltage for providing the noted control of the oscillator. Said lamp or diode controls the oscillator to stop or reduce the capacitor charging when the oscillator output and capacitor voltage rises to the value which causes the lamp or the diode to become conductive, and to restart or increase the capacitor charging when said voltage falls to the value which returns the lamp or diode to the nonconductive state. Due to the inherent instability and high hysteresis of neon lamps, and to the error multiplication introduced by the resistive dividers necessitated by the relatively low voltage ratings of such lamps, the arrangements employing such lamps have permitted the capacitor voltages to vary between oscillator turn-on and turn-off as much as 30 percent or more. This amounts to unsatisfactory performance in many instances. Also, the inherently very small hysteresis provided by diodes has made them generally unsatisfactory when employed in the foregoing manner, since this characteristic has resulted in the too frequent on-off cycling of the oscillator. Moreover, the nature of the arrangements just described has made it difficult to establish or set in the arrangements the specific chosen values at which it is desired to have the oscillator turned on and off.

Therefore, it has often been the case with the known arrangements that the capacitor working voltage range has not been consistently and accurately maintained to the desired degree. As a result, the capacitor charging has not consistently been terminated at the desired level, the battery energy has not been conserved to the greatest possible extent, and the protection from unduly high capacitor voltages has not been consistently obtained.

Another shortcoming of the known arrangements has been the absence therefrom of any means for protecting the battery from being excessively discharged. Although this shortcoming has given somewhat disadvantageous results in connection with so-called dry batteries, where the complete discharge of the battery can cause it to expand and leak, and hence to damage the associated equipment, this shortcoming has been particularly disadvantageous in connection with the popular rechargeable batteries, such as those of the nickel-cadmium type. The reason for this is that, if such a battery is discharged to the extent that any cell is completely discharged and driven into reversal, the continued withdrawal of energy from the other cells may well severely damage the battery. The lack of any means in the known arrangements for preventing the excessive withdrawal of the battery energy, or preventing the continued operation of an oscillator or other device after a cell of its powering battery has been driven into reversal, has presented a serious problem.

It is apparent from the foregoing, therefore, that the known arrangements have not consistently provided the desired degree of capacitor voltage control, capacitor protection, and battery conservation, and have not provided any degree whatsoever of battery protection.

SUMMARY OF THE INVENTION

Accordingly, it is an object of the present invention to provide improved controlling, protecting, or monitoring apparatus of the foregoing type which does not exhibit the noted shortcomings of the known arrangements of this type. Specifically, it is an object of the invention to provide improved apparatus which consistently controls the operation of a power supply to prevent the output voltage across a load device thereof, such as a capacitor, from moving or varying outside of an accurately maintained and readily set predetermined range or pair of limits, and/or to protect the battery which powers such a power supply from excessive energy withdrawal and from being excessively discharged and damaged. A more specific object of the invention is to provide improved apparatus as just described for controlling a battery operated d-c to d-c, capacitor-charging converter, such as an oscillator, (a) to maintain the converter output and capacitor voltage consistently and accurately within the desired range, thus positively to prevent the undue charging of the capacitor, to protect the latter from unduly high voltages, and to prevent the unnecessary expenditure of the battery energy, and/or (b) to prevent the converter input and battery voltage from decreasing below an accurately maintained and readily set predetermined minimum safe value, that is, a value which indicates that all cells of the battery are safely short of complete discharge or reversal.

In accordance with the present invention, the foregoing and other desirable objects are accomplished by the use in said improved apparatus of one or more novel circuit configurations, each of which includes a programmable unijunction transistor (PUT). Briefly stated, the PUT in its novel circuit compares a voltage to be monitored with a corresponding preset reference voltage, and controls the operation of the power supply in accordance with the results of this comparison. Said power supply may well be, and is assumed by way of example in the following explanation to be, a battery powered d-c to d-c converter oscillator which charges a capacitor, such as an electronic flash storage capacitor.

Specifically, for effecting the aforesaid maintenance of the oscillator output and capacitor voltage accurately within the desired working range, the aforesaid protection of the capacitor and other components from excessive voltages, and the aforesaid prevention of the unnecessary withdrawal of the battery energy, the monitored voltage is the oscillator output and capacitor voltage. Thus, a voltage representative of the last-mentioned voltage is compared by a PUT in one of said novel circuits with a fixed reference voltage. The circuit parameters are so chosen that, when the capacitor voltage has been raised to the desired maximum value by the operation of the oscillator, said PUT turns on and effectively turns off the oscillator. This prevents the latter from further increasing the capacitor voltage and charge. Further means are provided which turn said PUT off, thereby effectively turning the oscillator back on, when the capacitor voltage drops to or below a desired minimum value.

For effecting the aforesaid protection of the battery from being excessively discharged to the point of being damaged, by preventing the oscillator input and battery voltage from decreasing below a safe minimum value, the monitored voltage in said improved apparatus is the oscillator input and battery voltage. Thus, a voltage representative of the last-mentioned voltage is compared by a PUT in one of said novel circuits with a fixed reference voltage. The circuit parameters are so chosen that, when the oscillator input and battery voltage decreases to said safe minimum value, due to the withdrawal of energy from the battery by the oscillator, said PUT turns on and effectively turns off the oscillator. This prevents the latter from removing further energy from the battery, and hence from further discharging the battery.

While each of the two PUT circuits described above provides a desirable function and result as noted, and has utility when used alone, the use of these two circuits together provides the complete fulfillment of all of the objects noted above. That is, the combination of said circuits in said improved apparatus provides the accurate control of the capacitor voltage, the consistent protection of the capacitor and other components from excessive voltages, and the complete avoidance of the unwanted, both unnecessary and excessive, withdrawal or expenditure of the battery energy.

BRIEF DESCRIPTION OF THE DRAWING

A better understanding of the present invention may be had from the following detailed description when read in connection with the accompanying drawing, wherein the single FIGURE is a circuit diagram of an electronic flash apparatus including novel converter oscillator controlling means embodying the present invention.

DETAILED DESCRIPTION OF THE PREFERRED EMBODIMENT

The apparatus shown in the single FIGURE of the drawing, and illustrating a preferred example of apparatus embodying the present invention, is a complete electronic flash device of the type used for illuminating a scene or subject to be photographed. This device includes, in the customary manner, a d-c to d-c converter oscillator 1, which is powered by a low voltage battery 2 connected to the oscillator input, a flash storage capacitor 3 connected between conductors 4 and 5 which, in turn, are connected to the output of the oscillator 1, and a conventional flash tube circuit 6 of the type which is shown in the above-noted Schmidt et al. patent. The circuit 6 is connected to the conductors 4 and 5.

The oscillator 1 transforms the low voltage energy of the battery 2 into high voltage energy between the conductors 4 and 5, which energy charges the capacitor 3 at the customary high voltage level. The charge energy of the capacitor 3 powers the flash tube circuit 6 by way of the conductors 4 and 5 to enable the circuit 6 to provide flashes of light selectively in the known manner. The battery 2 is assumed, for purposes of illustration, to be of the rechargeable nickel-cadmium type.

In the drawing apparatus, the said novel control means embodying the present invention consists of a portion or means 7 which monitors both the input and the output voltages of the oscillator 1 and controls the operation of the latter in accordance with the values of these voltages. Specifically, the apparatus portion 7 controls the operation of the oscillator 1, by effecting the starting and the stopping thereof, as necessary (a) to maintain the oscillator output and capacitor 3 voltage between the conductors 4 and 5 consistently and accurately within a desired, set, predetermined working range, and (b) to prevent the oscillator input and battery 2 voltage from decreasing below the above-noted safe minimum value, to prevent the destruction of the battery The conventional flash tube circuit 6 includes a flash tube 9, a trigger transformer 10, a trigger capacitor 11, a normally open flash firing switch 12, and a trigger resistor 13. The switch 12 is representative of the usual camera shutter flash or synchronizing contacts, and/or the usual open flash or flash test switch.

The flash tube 9 has main electrodes 14 and 15 and a trigger electrode 16. The electrodes 14 and 15 are connected, respectively, to the conductors 4 and 5. The transformer 10 has a primary winding 17 which is connected in series with the resistor 13 and the capacitor 11 between the conductors 4 and 5. The switch 12 is connected across the series combination of the capacitor 11 and the winding 17. The transformer 10 also has a secondary winding 18 which is connected between the flash tube electrodes 15 and 16. Since the components 9 through 18 and their described interconnections are conventional, no further description thereof is deemed to be necessary herein.

The oscillator 1 can be of any of the known types of oscillator customarily employed for charging capacitors, and is shown by way of example as being a flyback oscillator of the improved type which is disclosed and claimed in the above-noted copending application. Thus, the oscillator 1 includes a transformer 19 having a primary winding 20, a secondary winding 21, a control winding 22, and a magnetic core 23. The windings 20, 21, and 22 are wound so that all of the dotted ends have the same instantaneous polarity. The oscillator 1 also includes an NPN transistor 24, diodes 25, 26 and 27, resistors 28, 29 and 30, and capacitors 31 and 32.

The transformer primary winding 20 is connected in series with the collector-emitter path of the transistor 24 across the battery 2. Specifically, the upper, positive terminal of the battery 2 is connected through a power switch 33 and an oscillator input terminal 34 to the upper end terminal of the winding 20, the lower end terminal of the winding 20 is connected to the transistor collector, and the transistor emitter is connected through an oscillator input terminal 35 to the lower, negative terminal of the battery 2. The latter connection includes a portion of the conductor 5.

The transformer control winding 22 is connected in series with the base-emitter path of the transistor 24, the diode 26, and the resistor 29. Specifically, the upper end terminal of the winding 22 is connected to the transistor base, and the transistor emitter is connected through the conductor 5, the diode 26, and the resistor 29 to the lower end terminal of the winding 22. The capacitor 32 is connected across the diode 26, and the diode 25 is connected between the transistor emitter and base. The resistor 28 is connected between transistor collector and base.

The transformer secondary winding 21 is connected in series with the diode 27 between the conductors 4 and 5, and hence across the capacitor 3 which is connected between these conductors. Specifically, the upper end terminal of the winding 21 is connected through the diode 27 to the conductor 4, and the conductor 5 is connected to the lower end terminal of the winding 21. The resistor 30 and the capacitor 31 are connected in series across the winding 21 for providing the usual buffer action.

By virtue of the connections which have been described, the battery 2 is connected to the input of the oscillator 1 by way of the terminals 34 and 35, and the capacitor 3 is connected to the output of the oscillator 1 and to the flash circuit 6 by way of the conductors 4 and 5.

The portion or means 7 includes a programmable unijunction transistor (PUT) 36 which is connected in a circuit for monitoring the oscillator output and capacitor 3 voltage which exists between the conductors 4 and 5, and for turning the oscillator 1 on and off as necessary to maintain the last-mentioned voltage within the aforementioned desired working range. In said circuit, the body of an adjustable resistor 37 is connected between the conductors 4 and 5, and the slider of this resistor is connected to the anode of the PUT 36. This provides the PUT 36 with a voltage which is representative of the voltage between the conductors 4 and 5. Such a representative voltage for the PUT 36 could, instead, be obtained from a different place in the apparatus if desired, such as from across the oscillator winding 22. The anode of the PUT 36 is also connected through a resistor 38 to one terminal of a capacitor 39, the other terminal of which is connected to the conductor 5.

A resistor 40 and a zener diode 41 are connected in series between the conductors 4 and 5, and the junction between these elements is connected through a resistor 42 to the anode gate, hereinafter referred to simply as the gate, of the PUT 36. This provides the latter with a fixed reference voltage which the PUT 36 compares with the representative voltage on its anode. Instead of the illustrated single zener diode 41, a plurality of such diodes connected in series could be used to improve the temperature stability of the reference voltage. A noise filtering capacitor 43 is connected between the gate and anode of the PUT 36 to prevent the latter from being triggered on by spikes in the voltages applied thereto.

The cathode of the PUT 36 is connected to the conductor 5 through the series combination of a zener diode 44 and a resistor 45. A capacitor 46 is connected in parallel with the resistor 45. The junction between the zener diode 44 and the resistor 45 is connected to the base of an NPN transistor 47, which may well be of the Darlington type. The emitter of the transistor 47 is connected through a diode 48 to the base of an NPN cut-off transistor 49. The collector of the transistor 47 is connected through an indicating lamp 50 to a conductor 51 which, in turn, is connected through the oscillator input terminal 34 and the switch 33 to the positive terminal of the battery 2. Suitable series and/or shunt resistors, not shown, may be connected to the lamp 50 to provide the desired current through the lamp.

The emitter of the cut-off transistor 49 is connected to the conductor 5 and thus to the emitter of the oscillator transistor 24. The collector of the transistor 49 is connected to the base of the oscillator transistor 24. Thus, the collector — emitter path of the cut-off transistor 49 is connected across the base-emitter path of the oscillator transistor 24. As a result, the oscillator 1 is disabled whenever the transistor 49 is on.

The portion or means 7 also includes a PUT 52 which is connected in a circuit for monitoring the oscillator input and battery 2 voltage which exists between the conductors 51 and 5, and which turns on, to turn off the oscillator 1, to prevent the last-mentioned voltage from decreasing below the aforementioned safe minimum value. In this circuit, the body of a resistor 53 is connected between the conductors 51 and 5, and the slider of this resistor is connected to the gate of the PUT 52. This provides the latter with a voltage which is representative of the oscillator input and battery voltage.

A resistor 54 and a zener diode 55 are connected in series between the conductors 51 and 5, and the junction between these elements is connected to the anode of the PUT 52. This provides the latter with a fixed reference voltage which the PUT 52 compares with the representative voltage on its gate. Instead of the last-mentioned connection, the PUT 52 could, if desired, be connected to means which would supply a turn-on voltage to the PUT 52 gate when the time required to charge the capacitor 3 indicated an undesirably low battery voltage. A noise filtering capacitor 56 similar to the capacitor 43 is connected between the gate and anode of the PUT 52.

The cathode of the PUT 52 is connected through a resistor 57 to the conductor 5, and is also connected to the base of an NPN transistor 58. The emitter of the latter is connected to the diode 48 along with the emitter of the transistor 47. The collector of the transistor 57 is connected through an indicating lamp 59 to the conductor 51. Suitable series and/or shunt resistors, not shown, may be connected to the lamp 59 to provide the desired current through the lamp.

MODE OF OPERATION OF THE PREFERRED EMBODIMENT

The apparatus of the drawing is put into operation by the closure of the switch 33. On the assumption that the voltage of the battery 2 between the conductors 51 and 5 is sufficiently high to make it safe to operate the oscillator 1, and on the assumption that the voltage between the conductors 4 and 5 is sufficiently low to make it necessary to raise the charge on the capacitor 3, said closure of the switch 33 will start the operation of the oscillator 1. The latter then operates to transfer the energy of the battery 2 progressively to the capacitor 3, whereby the capacitor charge and the voltage between the conductors 4 and 5 rise progressively with time in the usual manner. At this time, the PUT 36, the PUT 52, the transistors 47, 49, and 58, and the lamps 50 and 59 are off, and the oscillator transistor 24 is oscillating. The specific manner in which the oscillation of the transistor 24 and the oscillator 1 cause the charge and voltage on the capacitor 3 to rise progressively with time, as long as such oscillation continues, is of no significance here, but is described in detail in the above-noted copending application.

The PUT 36, in its circuit, monitors the rising oscillator output and capacitor 3 voltage between the conductors 4 and 5. For brevity, this voltage will be referred to hereinafter simply as the capacitor voltage. The PUT 36 accomplishes this monitoring by continuously comparing the PUT anode voltage, which is representative of the capacitor voltage, to the fixed reference voltage which the zener diode 41 causes to appear at the gate of the PUT 36. The position of the slider on the resistor 37 is so chosen, consistent with the ratings of the chosen zener diode 41 and PUT 36, that the latter remains off until the capacitor voltage has been raised to the desired maximum value. Stated differently, the slider on the resistor 37 is so positioned that the rising PUT 36 anode voltage exceeds the reference voltage on the PUT 36 gate and causes the PUT 36 to turn on or fire when the rising capacitor voltage reaches said desired maximum value.

Accordingly, when the capacitor voltage reaches the desired maximum value, the PUT 36 turns on and latches in this condition. This causes a current to flow from the conductor 4 and through the upper portion of the resistor 37, the PUT 36, the zener diode 44, the base-emitter path of the transistor 47, the diode 48, and the base-emitter path of the transistor 49 to the conductor 5. As a result, the transistor 47 turns on, causing the lamp 50 to be illuminated, and the transistor 49 turns on, causing the oscillator transistor 24 to be effectively short-circuited and the oscillator 1 to be cut off and stopped. At the instant that the PUT 36 turns on, the capacitor 39 sends additional current through the PUT 36 into the gates of the transistors 47 and 49 to cause these transistors to turn on rapidly and thus cut off the oscillator 1 rapidly.

As a result of the operation just described, the capacitor voltage is positively prevented from rising above said desired maximum value. The illumination of the lamp 50 indicates that the charge on the capacitor 3 is now at the desired value which will cause the flash tube 9 to produce the rated quantity of light if now fired, and that the oscillator 1 has been cut off.

The PUT 36, continuing to monitor the capacitor voltage, remains on, and the oscillator 1 remains off, until the capacitor voltage drops sufficiently to reduce the PUT anode voltage to the turn-off value. This value is determined by the zener rating of the zener diode 44 as well as the rating of the PUT 36. By the proper choice of these ratings, the value of capacitor voltage at which the PUT 36 turns off is made to be the desired minimum value of the capacitor voltage. Said capacitor voltage drop will be either a progressive one to the desired minimum value, due to capacitor leakage or to the use of energy by other components connected between the conductors 4 and 5, or will be an abrupt one to a value well below the desired minimum value, due to the firing of the flash tube 9. In either case, the PUT 36 turns off when the capacitor voltage reaches the desired minimum value.

It is noted that, if the zener diode 44 where not present, the PUT 36 would not be turned off by the decreasing capacitor voltage until that voltage had decreased to an undesirably low value determined by the normal turn-off anode voltage of the PUT 36. That is, the PUT 36 circuit would exhibit an excessively high hysteresis. The zener diode 44 effectively reduces this hysteresis by raising the cathode voltage of the PUT 36, when the latter turns on, above the voltage of the conductor 5. Thus, a relatively small anode voltage change, corresponding to the decrease in the capacitor voltage to the desired minimum value, is effective to turn off the PUT 36.

Accordingly, when the capacitor voltage decreases to the desired minimum value, the PUT 36, and hence the transistors 47 and 49 and the lamp 50, turn off. As a result, the oscillator transistor 24 is no longer short-circuited, and the oscillator 1 restarts. As long as the switch 33 remains closed and the oscillator input and battery voltage remain adequate, the PUT 36 continues to start and stop the oscillator 1 alternatively in the above-described manner as necessary to keep the capacitor voltage accurately within the desired working range and, of course, to bring that voltage up into that range following each firing of the flash tube 9 and each initial start-up of the apparatus.

While the foregoing operation is taking place, the PUT 52, in its circuit, is monitoring the oscillator input and battery voltage between the conductors 51 and 5, hereinafter referred to simply as the battery voltage. The PUT 52 accomplishes this monitoring by continuously comparing the PUT gate voltage, which is representative of the battery voltage, to the fixed reference voltage which the zener diode 55 causes to appear at the anode of the PUT 52. The position of the slider on the resistor 53 is so chosen, consistent with the ratings of the chosen zener diode 55 and PUT 52, that the latter remains off until the battery voltage drops to the above-noted safe minimum value, which it does after the oscillator 1 has been in operation for some period of time. Stated differently, the slider on the resistor 53 is so positioned that the PUT 52 gate voltage drops below the reference voltage on the PUT 52 anode sufficiently to cause the PUT 52 to turn on when the battery voltage drops to said safe minimum value. As previously noted, the arrival of the battery voltage at this value means that the withdrawal of energy from the battery 2 should now be terminated so that damage of the battery will be avoided.

Thus, when the battery voltage drops to said safe minimum value, the PUT 52 turns on and latches in this condition. This causes a current to flow from the conductor 51 and through the resistor 54, the PUT 52, the base-emitter path of the transistor 58, the diode 48, and the base-emitter path of the transistor 49 to the conductor 5. As a result, the transistor 58 turns on, causing the lamp 59 to be illuminated. Also, the transistor 49 turns on and stops the oscillator 1, unless the latter is already off due to the operation of the transistor 47. In either event, the PUT 52 and the transistors 58 and 49 now remain on and maintain the oscillator 1 off to prevent the further discharge of the battery 2 by the oscillator 1. This condition obtains until the switch 33 is opened and the battery 2 is disconnected from the rest of the apparatus.

The illumination of the lamp 59, which continues until the switch 33 is opened, indicates that the charge on the battery 2 is sufficiently low to require that the battery be recharged, and also indicates that the apparatus has operated to effectively disconnect the battery 2 from the oscillator 1 to protect the battery 2 from further discharge and from damage. Reclosure of the switch 33 before the charge on the battery has been increased will only again turn on the PUT 52 and the transistors 58 and 49, which will continue to prevent the oscillator 1 from draining energy from the battery 2.

After the charge and voltage of the battery 2 have been raised, by suitably charging the latter by means not shown, the PUT 52 and the transistors 58 and 49 will not turn on upon the closure of the switch 33. The absence of the illumination of the lamp 59 then indicates that the apparatus has been returned to the working condition wherein the battery 2 is capable of safely operating or powering the oscillator 1.

By virtue of the foregoing operation, the capacitor 3 is accurately, safely, and efficiently charged and recharged as necessary to permit the flash tube 9 to produce the desired flashes of light. Although the operation of the flash tube circuit 6, in selectively producing flashes of light, is conventional, and is the same as that of the flash tube circuit of the above-noted Schmidt et al. patent, a brief description of such operation will now be given.

When the capacitor 3 is charged, the capacitor 11 will also be charged, but the flash tube 9 will be nonconductive. The subsequent closure of the switch 12 will discharge the capacitor 11 into the winding 17, which in turn will cause the winding 18 to produce a triggering voltage between the flash tube electrodes 15 and 16. This will fire the flash tube 9, causing it to conduct current from the capacitor 3 and to emit light in the known manner.

When the charge on the capacitor 3 becomes depleted by the conduction of the flash tube 9, the latter will become nonconductive. The oscillator 1, which will have been started by the transistor 49 as the capacitor 3 voltage dropped, will now recharge the capacitor 3 to be ready for the next closure of the switch 12 and firing of the flash tube 9.

TYPICAL VALUES

By way of illustration and example, and not by way of limitation, it is noted that, in apparatus constructed and operated in accordance with the present invention and having the circuit illustrated in the drawing, the circuit components associated with the portion 7 had the following values:

| | |
|---|---|
| Battery 2 | 10.6 volts |
| Capacitor 3 | 1500 mf. at 360 volts |
| PUT 36 | Type D13T1 |
| Resistor 37 | 1.5 megohms |
| Resistor 38 | 470 K ohms |
| Capacitor 39 | .01 mf. |
| Resistor 40 | 22 megohms |
| Zener Diode 41 | 3–7.3 volt zener diodes in series |
| Resistor 42 | 1 megohm |
| Capacitor 43 | 2200 pf. |
| Zener Diode 44 | 7.3 volt |
| Resistor 45 | 390 K ohms |
| Capacitor 46 | 820 pf. |
| Transistor 47 | Type D16P1 |
| Diode 48 | 75 volt |
| Transistor 49 | Type D32K1 |
| PUT 52 | Type D13T1 |
| Resistor 53 | 5K ohms |
| Resistor 54 | 560 ohms |
| Zener Diode 55 | 6.8 volt |
| Capacitor 56 | 500 mf. |
| Resistor 57 | 1 K ohms |
| Transistor 58 | Type 2N3904 |

CONCLUSION

It is believed to be clear from the foregoing description that the described apparatus according to the present invention fulfills the objects stated herein. Thus, it has been shown that said apparatus provides the consistent, accurate control of the capacitor voltage within a readily set, desired working range, provides the consistent protection of the capacitor and other components from excessive voltages, prevents the unnecessary use of the battery energy, and protects the battery from excessive discharge and damage. Said apparatus accomplishes these desirable results by employing the described PUT circuits which provide readily set and controllable turn-on and turn-off points and hysteresis values.

The embodiments of the invention in which an exclusive property or privilege is claimed are defined as follows:

1. Monitoring apparatus for effectively terminating the operation of a d-c to d-c converter oscillator when the output voltage thereof increases to a predetermined maximum value therefor, and for restarting the operation of the oscillator when the output voltage thereof decreases to a predetermined minimum value therefor, comprising a pair of conductors arranged for connection to the output of a d-c to d-c converter oscillator to cause an output voltage of said oscillator to appear between said conductors when said oscillator is operating, a programmable unijunction transistor having anode, cathode, and gate electrodes, reference voltage means connected between said gate and said cathode to establish therebetween a reference voltage of a predetermined value, means connecting said anode and said cathode between said conductors to cause said transistor to turn on and to conduct anode-cathode current when the value of the voltage between said conductors increases to a predetermined maximum value established by the value of said reference voltage, current responsive means connected to said transistor and to said oscillator and responsive to said anode-cathode current to effectively terminate the operation of said oscillator upon the appearance of said anode-cathode current, and a zener diode connected in series with said cathode to turn off said transistor, to effectively restart the operation of said oscillator, when the value of said voltage between said conductors decreases to a predetermined minimum value established by the zener rating of said diode.

2. Apparatus for terminating the charging of a capacitor when the voltage thereof reaches a predetermined maximum value therefor, and for restarting the charging of the capacitor when the voltage thereof decreases to a predetermined minimum value therefor, comprising a programmable unijunction transistor having anode, cathode, and gate electrodes, reference voltage means connected between said gate and said cathode to establish therebetween a reference voltage of a predetermined value, a capacitor connected to a source of charging current which, when operating, passes a charging current through said capacitor which progressively increases the voltage across said capacitor, means connecting said anode and said cathode across said capacitor, whereby said transistor turns on and conducts anode-cathode current when the value of the voltage across said capacitor increases to a predetermined maximum value established by the value of said reference voltage, current responsive means connected to said transistor and to said source of current and responsive to said anode-cathode current to terminate the operation of said source of current and the charging of said capacitor upon the appearance of said anode-cathode current, and a zener diode connected in series with said cathode to turn off said transistor, to restart the operation of said source of current, when the value of the voltage across said capacitor decreases to a predetermined minimum value established by the zener rating of said diode.

3. In electronic flash apparatus including a capacitor, a flash tube for selectively discharging said capacitor to produce flashes of light, and a d-c to d-c converter oscillator powered by a battery and connected to supply output voltage and charging current to said capacitor when said oscillator is operating, the improvement comprising a programmable unijunction transistor having anode, cathode, and gate electrodes, reference voltage means connected between said gate and said cathode to establish therebetween a reference voltage of a predetermined value, means connecting said anode and said cathode to said capacitor to produce between said anode and said cathode a voltage which is representative of the voltage across said capacitor, and to cause said transistor to turn on and to conduct anode-cathode current in an anode-cathode circuit when the voltage across said capacitor increases to a predetermined desired maximum value established by the value of said reference voltage, current responsive means connected to said anode-cathode circuit and to said oscillator and responsive to said anode-cathode current to effectively terminate the operation of said oscillator and the charging of said capacitor upon the appearance of said anode-cathode current, thereby to prevent the voltage across said capacitor from exceeding said maximum value, and a zener diode connected in series with said cathode in said anode-cathode circuit to turn off said transistor, to restart the operation of said oscillator, when the voltage across said capacitor decreases to a predetermined desired minimum value established by the zener rating of said diode.

4. Apparatus as specified in claim 3, wherein said reference voltage means includes a resistor and a zener diode connected in series across said capacitor, and includes means connecting the last mentioned diode between said gate and said cathode.

5. Apparatus as specified in claim 3, including a second programmable unijunction transistor having anode, cathode, and gate electrodes, second reference voltage means connected between said anode and said cathode of said second transistor to establish therebetween a second reference voltage of a predetermined value, means connecting said gate and said cathode of said second transistor to said battery to produce between said gate and said cathode of said second transistor a voltage which is representative of the voltage across said battery, and to cause said second transistor to turn on and to conduct anode-cathode current in an anode-cathode circuit when the voltage across said battery decreases to a predetermined minimum value established by the value of said second reference voltage, and means connecting said anode-cathode circuit of said second transistor to said current responsive means to cause the latter to effectively terminate the operation of said oscillator and the discharging of said battery upon the appearance of said anode-cathode current of said second transistor, thereby to prevent said oscillator from reducing the voltage across said battery below said minimum value.

6. Apparatus as specified in claim 5, wherein said battery is a rechargeable battery of the nickel-cadmium type.

7. Apparatus as specified in claim 5, wherein said current responsive means includes a cut-off transistor which is so connected to the said anode-cathode circuit of each of said unijunction transistors as to turn on upon the appearance of said anode-cathode current in either of said anode-cathode circuits, and wherein said cut-off transistor is so connected to said oscillator as to prevent the latter from oscillating when said cut-off transistor is turned on.

8. In electronic flash apparatus including a capacitor, a flash tube for selectively discharging said capacitor to provide flashes of light, and a d-c to d-c converter oscillator powered by a battery and connected to supply output voltage and charging current to said capacitor when said oscillator is operating, the improvement comprising a programmable unijunction transistor having anode, cathode, and gate electrodes, reference voltage means connected between said anode and said cathode to establish therebetween a reference voltage of a predetermined value, means connecting said gate and said cathode to said battery to produce between said gate and said cathode a voltage which is representative of the voltage across said battery, and to cause said transistor to turn and latch on and to conduct anode-cathode current in an anode-cathode circuit when the voltage across said battery decreases to a predetermined minimum value established by the value of said reference voltage, and current responsive means connected to said anode-cathode circuit and to said oscillator and responsive to said anode-cathode current to effectively terminate the operation of said oscillator and the discharging of said battery upon the appearance of said anode-cathode current, thereby to prevent said oscillator from reducing the voltage across said battery below said minimum value, said transistor remaining latched on notwithstanding any rise in the voltage across said battery which occurs upon said termination of the operation of said oscillator.

9. Apparatus as specified in claim 8, wherein said reference voltage means includes a resistor and a zener diode connected in series across said battery, and includes means connected said diode between said anode and said cathode.

10. Apparatus as specified in claim 8, wherein said battery is a rechargeable battery of the nickel-cadmium type.

11. Apparatus as specified in claim 8, including a signalling means connected to respond to said anode-cathode current and producing a signal in the presence of said anode-cathode current.

* * * * *